(12) United States Patent
Kim et al.

(10) Patent No.: US 6,188,060 B1
(45) Date of Patent: Feb. 13, 2001

(54) OPTICAL DISK SIGNAL CONVERSION WITH PEAKING COMPENSATION

(75) Inventors: Je-Kook Kim, Seoul; Young-Wook Jang, Yongin, both of (KR)

(73) Assignee: Samsung Electronics Co., LTD (KR)

(*) Notice: Under 35 U.S.C. 154(b), the term of this patent shall be extended for 0 days.

(21) Appl. No.: 09/286,238

(22) Filed: Apr. 5, 1999

(30) Foreign Application Priority Data

Apr. 13, 1998 (KR) .................................................. 98-13120
Jun. 8, 1998 (KR) .................................................. 98-21063

(51) Int. Cl.⁷ .................................................. H01J 40/14
(52) U.S. Cl. .................................. 250/214 R; 250/214 C; 369/44.32
(58) Field of Search ........................... 250/214 R, 214.1, 250/214 C, 214 A; 327/100, 102, 103; 369/44.32, 44.33

(56) References Cited

U.S. PATENT DOCUMENTS 6,114,894 * 9/2000 Choo .................................... 327/362

* cited by examiner

*Primary Examiner*—Que T. Le
(74) *Attorney, Agent, or Firm*—Samuels, Gauthier & Stevens LLP

(57) ABSTRACT

An optical signal conversion apparatus in a compact disk player detects peaking in an RF signal read from a disk and compensates to reproduce a stable conversion signal, for example an EFM signal. In the optical signal conversion apparatus, a peaking prevention portion detects peaking of the RF input signal and outputs a predetermined reference voltage, if the peaking is detected, or alternately the input signal, if the peaking is not detected. A waveform processing portion extracts a high frequency component from the signal output from the peaking prevention portion, slices the extracted signal as a predetermined level, and outputs the sliced signal.

28 Claims, 12 Drawing Sheets

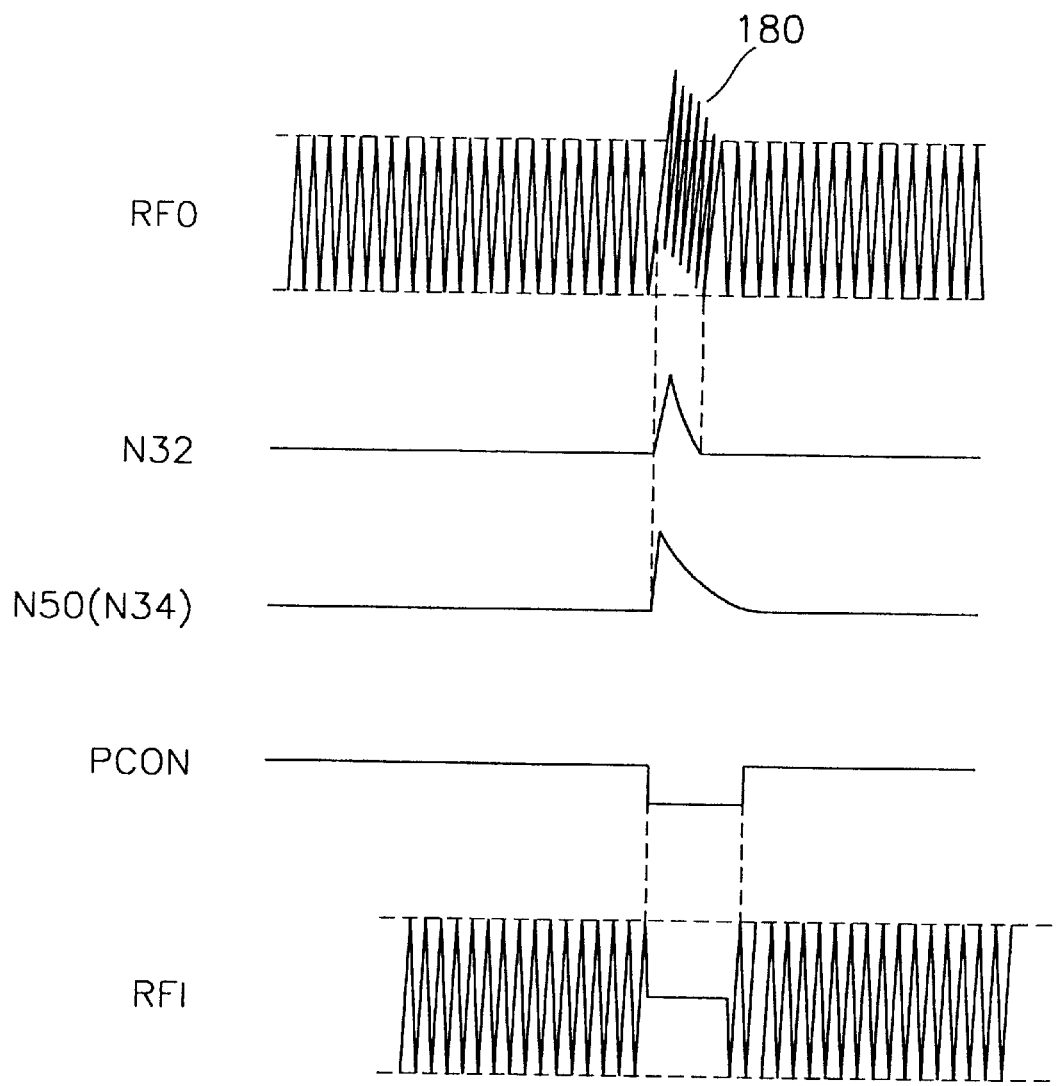

CONVENTIONAL RFI

IMPROVED RFI

OPTICAL DISK SIGNAL CONVERSION WITH PEAKING COMPENSATION

BACKGROUND OF THE INVENTION

1. Field of the Invention

The present invention relates to a signal reproduction apparatus of an optical disk player, for example a compact disk (CD) player, and more particularly, to an optical signal conversion apparatus in which peaking detected from an RF signal read from a disk is compensated in order to reproduce a stable output signal.

2. Description of the Related Art

In general, a CD player includes a preamplifier, a data strobe portion, a digital signal processor, an analog-to-digital (A/D) converter, and an analog circuit portion. The preamplifier amplifies a signal sensed by a photodiode, removes noise and distortion from the signal using a waveform equalizer, and then transmits the signal to the digital signal processor following waveform-shaping. The preamplifier commonly includes an adder, an automatic gain controller (hereinafter "AGC"), a waveform equalizer and a data slicer circuit.

The data slicer circuit shapes the signal waveform equalized by the waveform equalizer and converts the signal into a rectangular pulse. Since a slice level should be set at the center of an eye pattern, if the slice level is set at a level beyond the center of the eye pattern, an error is generated in the pulse width of the positive and the negative and accordingly a data error is generated. This asymmetry phenomenon commonly occurs when the degree of asymmetry in the CD data pits is greater than 20%.

The data slicer circuit commonly includes a correction circuit for correcting the asymmetry phenomenon. The eye pattern may have a defect due to a pin-hole generated during the disk manufacturing process. When the eye pattern is applied as an input to an eight-to-fourteen modulation (EFM) circuit and then passed through a passive high pass filter (hereinafter "HPF"), a peaking phenomenon of the eye pattern occurs wherein the eye pattern is not integrated instantaneously in the defect interval. Thus, in EFM slicing, since the EFM input does not trace DC offset instantaneously, it is sliced at an incorrect DC level thereof. The incorrect DC level causes troubles in error correction (hereinafter "ECC").

The EFM signal conversion apparatus used for the conventional optical disk reproduction system including a high frequency slicer, or an RF slicer, converts an RF signal into a digital EFM signal. A typical EFM signal conversion apparatus slices an RF signal received by a photodiode.

FIG. 11 is a circuit diagram showing a conventional EFM signal conversion apparatus. The EFM signal conversion apparatus includes a capacitor C, a comparator 110, operational amplifiers 112 and 114, resistors R1, R2, R3, and R4, resistors R5 and R6 and capacitors C1 and C2 constituting a two-stage low pass filter (LPF) 116, and invertors I1 and I2 constituting a MOS buffer 118.

In the operation of the EFM signal conversion apparatus having an eye pattern of a CD player as a non-inverting input of the comparator 110, a DC offset is extracted by passing the output of the comparator 110 through the two-stage LPF 116. The extracted DC offset is fed back as an inverting input of the comparator 110. The comparator 110 corresponds to the above-described data slicer circuit. As the eye pattern is applied as the input of the comparator 110, the eye pattern passes through an HPF differentiator.

The capacitor C shown in FIG. 11 as receiving an RFO signal output from the photodiode removes a DC component from the RFO signal and outputs the RFI signal removed of the DC component to the non-inverting input terminal of the comparator 110. Here, the comparator 110 compares the RFI signal input to the non-inverting input terminal thereof with the signal output from the operational amplifier 112 and outputs the comparison result as a digital EFM signal via an output terminal OUT. After being buffered in the MOS buffer 118, the digital EFM signal passes through the LPF 116, where DC offset is detected, and an asymmetry buffer and an asymmetry amplifier, and finally is fed back to the comparator 110. Here, the asymmetry buffer corresponds to the operational amplifier 114 of an emitter-follower type and the asymmetry amplifier consists of the resistors R1, R2, R3, and R4 and the operational amplifier 112.

In the conventional EFM signal conversion apparatus, since the asymmetry phenomenon occurring due to manufacturing deviation cannot be removed with only an AC coupling, it is used when the probability of generation of 1 or 0 according to the digital EFM signal is 50%. However, when a defect occurs such as a scratch or pin-hole, this technique is time consuming, as long as the external time constant, for example approximately 5 ms, in order that the slice reference level for the eye pattern tracks an accurate DC level for the eye pattern following the defect interval.

Accordingly, during the period of an input signal where there is no eye pattern or wherein the eye pattern is defective, when the abnormal signal portion is differentiated, the DC level of the eye pattern may instantaneously peak. Since it normally takes a long time to extract a DC offset, the eye pattern cannot be sliced during this brief period. Namely, in the conventional EFM signal conversion apparatus, when an optical disk contains a scratch or pin-hole defect, it is a problem that it takes a time as long as the external time constant for the slice reference level output from the operational amplifier 112 to trace an accurate DC level of an RF signal.

Further, since the asymmetry of the RF signal is not appropriately compensated during the period where defects exist, an error correction portion connected to the rear end of the EFM signal conversion apparatus is prevented from accurately correcting errors.

SUMMARY OF THE INVENTION

To solve the above problem, it is an object of the present invention to provide an optical signal conversion apparatus in an optical disk reproduction system which prevents peaking of an analog signal input to a data slicer to accurately reproduce a conversion signal, for example an EFM signal.

It is another objective of the present invention to provide an optical signal conversion apparatus, for example an EFM signal conversion apparatus, of an optical disk reproduction system for detecting a stable EFM signal which detects peaking of an analog input signal according to the pulse width of an EFM output signal and controls the signals input to the data slicer according to the state of detection.

Accordingly, to achieve the first objective, there is provided an optical signal conversion apparatus, for example an EFM signal conversion apparatus, for converting an RF input signal read from a disk into an EFM signal, the apparatus comprising: a peaking prevention portion which detects peaking of the RF input signal and outputs a predetermined reference voltage, if the peaking is detected, or alternately the input signal, if the peaking is not detected;

and a waveform processing portion which extracts a high frequency component from the signal output from the peaking prevention portion, slices the extracted signal as a predetermined level, and outputs the sliced signal.

The peaking prevention portion preferably comprises: a peaking detector which detects peaking of the input signal and outputs a control signal according thereto; and a selector which receives a predetermined reference voltage and the input signal and selects and outputs the reference voltage if the peaking is detected, or the input signal if the peaking is not detected, in response to the control signal.

The peaking detector preferably comprises: a bottom envelope detector which amplifies the input signal and outputs the same, if the input signal is higher than a predetermined threshold voltage, and otherwise, outputs the threshold voltage; an envelope hold circuit which responds rapidly to rise of an output signal from the bottom envelope detector and slowly to fall of the output signal from the bottom envelope detector; and a comparator which compares the output signal from the bottom envelope detector with an output signal from the envelope hold circuit.

To achieve the first objective, there is provided an optical signal conversion apparatus, for example an EFM signal conversion apparatus, according to another preferred embodiment of the present invention which comprises: a high frequency extraction portion which extracts a high frequency component of the RF input signal and outputs the same as a conversion signal; and a slice portion which slices the conversion signal by a predetermined level and outputs the sliced signal, in which, in the slice portion, the amount of current supplied or sank is variable according to multiple speed.

The slice portion preferably comprises: a comparator in which the conversion signal is connected to a non-inverting input terminal; an amplifier in which an asymmetric signal which is generated by low-pass-filtering the output signal of the comparator is connected to an input terminal thereof and an output signal thereof is connected to an inverting input terminal of the comparator; and a current compensator which variably supplies or sinks current to the amplifier in response to the output signal from the comparator and also a predetermined multiple speed determination signal.

Also, it is preferable in the present invention that the current compensator comprises: a current source portion in which a plurality of current sources each providing current of a different amount are arrayed in parallel; a current sink portion in which a plurality of current sinks each sinking current of a different amount are arrayed in parallel; and a switch portion in which the asymmetric signal is connected to one of the current sources or the current sinks in response to the output signal of the comparator and also the predetermined multiple speed determination signal.

To achieve the second objective, there is provided an optical signal conversion apparatus according to yet another preferred embodiment of the present invention which comprises: a high pass filter which filters a high frequency signal from the input signal and outputs the filtered signal and is capable of varying a predetermined parameter to vary differentiation time according to a predetermined control signal; a comparator which receives a signal passing through the high pass filter and generates a conversion signal, for example an EFM signal, by slicing the received signal by a predetermined level; a peaking detector which detects a peaking period according to run-length of the EFM signal output from the comparator and generates the control signal which is applied to the high pass filter during the detected period; and a slicing level generator which generates a slicing level according to a direct current level of the EFM signal, which returns to the comparator.

The high pass filter preferably includes a capacitor and first and second resistors, and a first switch which turns a value of the second resistor on or off according to the control signal from the peaking detector is further included.

Also, it is preferable in the present invention that the peaking detector detects a period in which run-length of the EFM signal output from the comparator is greater than a predetermined length and generates the control signal during the detected period.

To achieve the second objective, there is provided an optical signal conversion apparatus according to yet another preferred embodiment of the present invention which comprises: a high pass filter which filters a high frequency signal from the input signal and outputs the filtered signal; a comparator which receives a signal passing through the high pass filter and generates a conversion signal, for example an EFM signal, by slicing the received signal by a predetermined level; a peaking detector which detects a peaking period according to run-length of the EFM signal output from the comparator and generates a control signal during the detected period; and a slicing level generator which selects, according to the control signal, one of the EFM signal and an asymmetric signal in the previous period which is held and generates a slicing level which returns to the comparator.

It is preferable in the present invention that the slicing level generator comprises: a second switch which selects one of the EFM signal or the asymmetric signal according to the control signal; a low pass filter which detects a signal of direct current level from an output signal of the second switch and generates an asymmetric signal; a buffer which buffers the asymmetric signal that is the output signal of the low pass filter and outputs the same to an input terminal of the second switch; and an amplifier which amplifies the buffered asymmetric signal into a predetermined level and returns the amplified signal to the comparator.

Also, it is preferable in the present invention that the peaking detector detects a period in which run-length of the EFM signal output from the comparator is greater than a predetermined length and generates the control signal during the detected period.

The present invention is applicable to any of a number of optical disk systems, for example compact disk systems.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 2 is a timing diagram illustrating the operation of the signal conversion apparatus according to the present invention.

DETAILED DESCRIPTION OF PREFERRED EMBODIMENTS

Figure 1A:
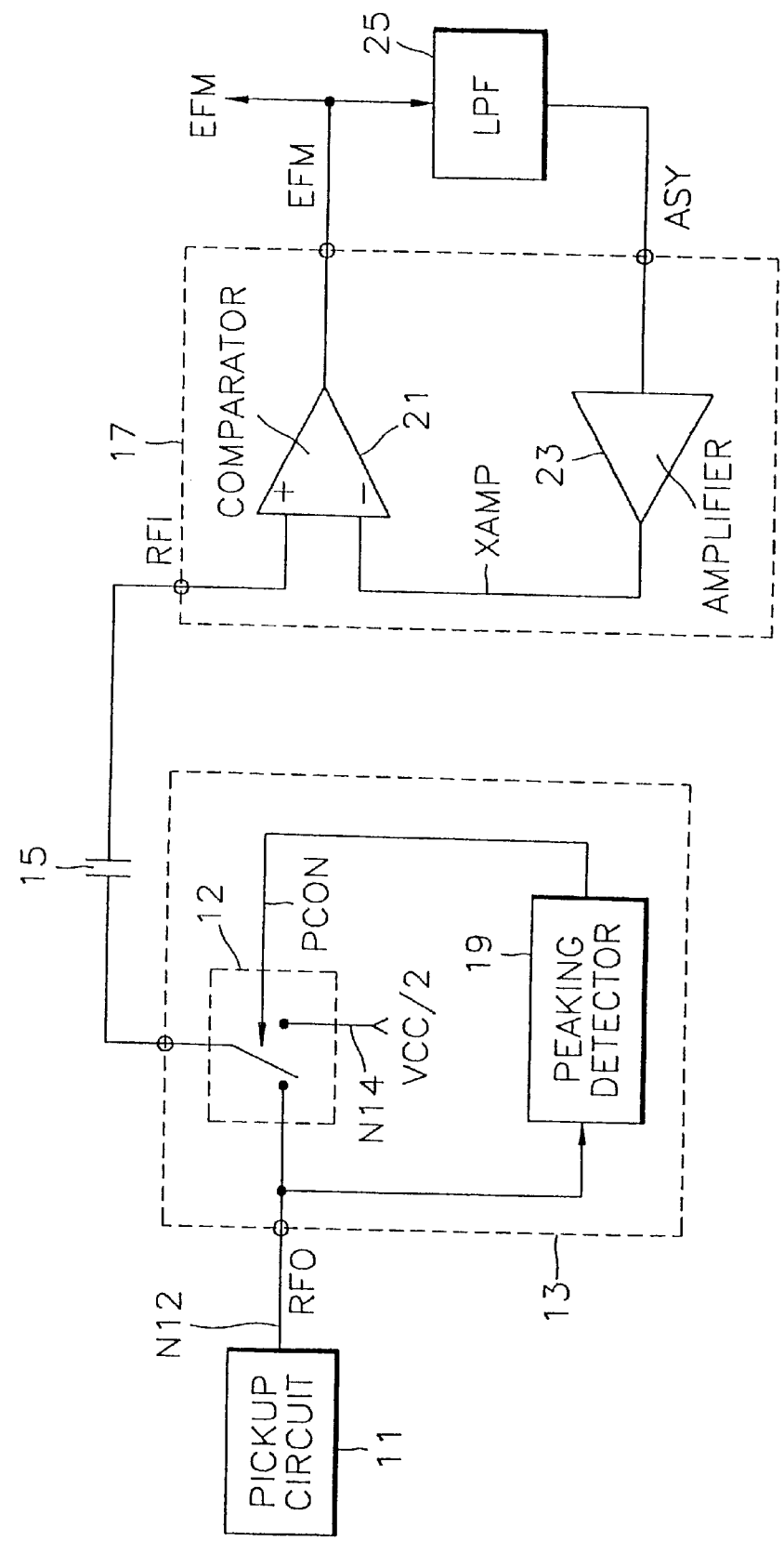
FIG. 1A is a circuit diagram of an EFM signal conversion apparatus according to the first preferred embodiment of the present invention.

FIG. 1A is a circuit diagram of an optical signal conversion apparatus according to a first preferred embodiment of the present invention. A pickup circuit 11 of FIG. 1A includes a photodiode. An input signal RFO detected by the pickup circuit 11 is received at a first input terminal N12. When peaking is generated at the input signal RFO, a peaking prevention portion 13 outputs a reference voltage VCC/2 to a waveform processor. Preferably, the waveform processor includes a high frequency extractor 15, such as a capacitor, and a slicer 17.

The high frequency extractor 15 extracts a high frequency component of an input signal, and outputs an RFI signal. The slicer 17 receives the RFI signal and generates a conversion signal, for example an EFM output signal, by slicing the received RFI signal by a predetermined level.

The peaking prevention portion 13 includes a peaking detector 19 and a selective switch 12. The peaking detector 19 detects peaking of the input signal RFO and generates a control signal PCON. The selective switch 12, in response to the control signal PCON, transmits the reference voltage VCC/2 input through a second input terminal N14 to the high frequency extractor 15, if peaking is detected at the input signal RFO, or, alternatively, the input signal RFO, if peaking is not detected.

Figure 1B:
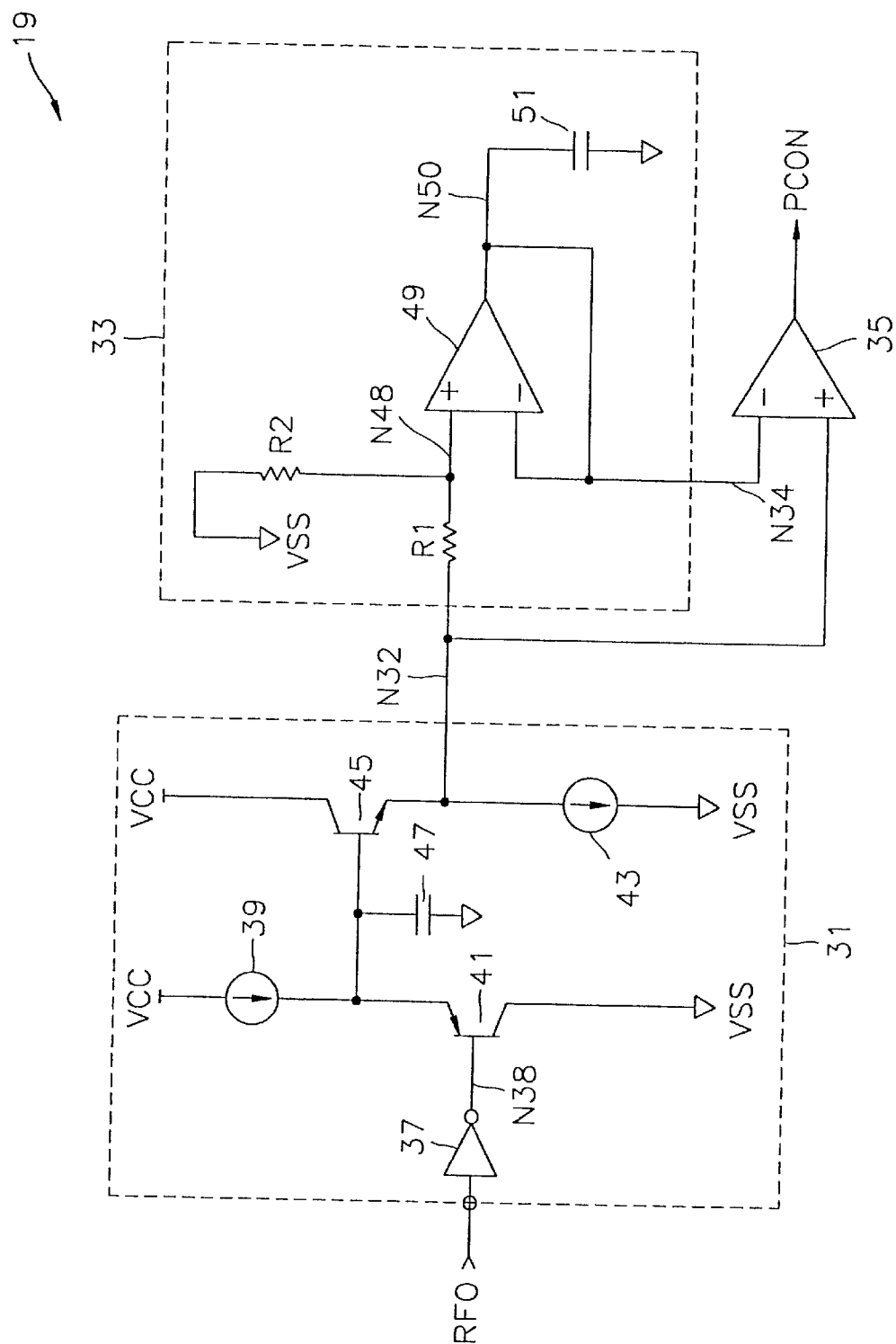
FIG. 1B is a circuit diagram of a preferred embodiment of the peaking detector of FIG. 1.

FIG. 1B is a circuit diagram of a preferred embodiment of the peaking detector 19 shown in FIG. 1A. Referring to FIG. 1B, the peaking detector 19 includes a bottom envelope detector 31, an envelope hold circuit 33, and a comparator 35. The bottom envelope detector 31 outputs an amplified input signal if the input signal is higher than a predetermined threshold voltage, or otherwise, outputs the threshold voltage. In the present embodiment, the threshold voltage comprises a boundary voltage which determines the logic status of the output N38 of an inversion amplification circuit 37 as "high" or "low".

The envelope hold circuit 33 makes a rapid response in a rising period of an output signal N32 of the bottom envelope detector 31, and makes a slow response in a falling period thereof. The comparator 35 compares the output signal N32 of the bottom envelope detector 31 with an output signal N34 of the envelope hold circuit 33 and thus outputs a control signal PCON.

The bottom envelope detector 31 may include, for example, a current source 39, a PNP transistor 41, a current sink 43, an NPN transistor 45, and an electric condenser 47 such as a capacitor. The current source 39 supplies a predetermined amount of current. The PNP transistor 41 has a base receiving the inverted RFO signal N38, and an emitter to which the current from the current source 39 is supplied. The current sink 43 sinks a predetermined amount of current. The NPN transistor 45 has a base connected to the emitter of the PNP transistor 41. The electric condenser 47 serves as a means for charging current flowing through the base of the NPN transistor 45.

The bottom envelope detector 31 operates as follows. When a voltage level of the input signal RFO rises above the threshold voltage, the voltage level of an output signal of the inverter 37 becomes "low" and the PNP transistor 41 is turned on to discharge the electric condenser 47. In response, the voltage level of the base of the NPN transistor 45 falls, and thus, the voltage level of the output signal N32 of the bottom envelope detector 31 rises.

When the voltage level of the input signal RFO falls below the threshold voltage, the voltage level of the output of the inverter 37 rises and the PNP transistor 41 is turned off to charge the electric condenser 47. In response, the voltage level of the base of the NPN transistor 45 rises and the NPN transistor 45 is turned off. Thus, the voltage level of the output signal N32 of the bottom envelope detector 31 becomes the threshold voltage.

The envelope hold circuit 33 includes a comparator 49 and an electric condenser 51 such as a capacitor. The comparator 49 has a non-inverting input terminal and an inverting input terminal, to which a signal N48 divided by resistors R1 and R2 and an output signal of the comparator 49 itself, are applied respectively. The signal N48 varies in proportion to the output signal N32 of the bottom envelope detector 31, and the voltage level thereof is determined by the resistors R1 and R2. The electric condenser 51 is connected to an output terminal N50 of the comparator 49. The comparator 49 responds rapidly to the rising voltage of the signal N48, and slowly to the falling voltage of the signal N48.

The comparator 35 compares the output signal N32 of the bottom envelope detector 31 with the output signal N50 of the envelope hold circuit 33 to thereby output the control signal PCON.

The operation of the peaking detector 19 is as follows with reference to FIG. 2. When peaking is generated at the input signal RFO, and thus the voltage rises abnormally fast, the voltage of the output signal N32 of the bottom envelope detector 31 rapidly rises. And, the voltage of the output signal N50 of the envelope hold circuit 33 also rises rapidly.

When the input signal RFO where peaking is generated returns to the normal voltage state, the voltage of the output signal N32 of the bottom envelope detector 31 rapidly decreases. However, the voltage of the output signal N50 of the envelope hold circuit 33 returns slowly.

In the above state, there may be a case in which the voltage of the output signal N32 of the bottom envelope detector 31 is lower than the voltage of the output signal N50 of the envelope hold circuit 33. Thus, the logical state of the control signal PCON, which is an output signal of the comparator 35 and maintains a "high" state in the normal state, is changed into a "low" state and thus the peaking generated at the input signal RFO is detected.

Referring to FIG. 1A again, the selective switch 12 selects and outputs one of two input signals in response to the control signal PCON. That is, when the input signal RFO is in the normal state, the control signal PCON becomes "high" and thus the input signal RFO is transmitted to the high frequency extractor 15. However, when the input signal RFO is in an abnormal state, that is, peaking is generated at the input signal RFO, the control signal PCON becomes "low" and thus the reference voltage VCC/2 is transmitted to the high frequency extractor 15.

The slicer 17 includes a comparator 21 and an amplifier 23. The comparator 21 has a non-inverting input terminal connected to the signal RFI and an inverting input terminal connected to an output signal XAMP of the amplifier 23. The output signal of the comparator 21 is provided to an external low pass filter 25. An asymmetric signal ASY, which is the output signal of the low pass filter 25, is input to the amplifier 23.

FIG. 2 is a timing diagram illustrating the operation of the signal conversion apparatus of the present invention. With reference to FIGS. 1A and 1B, FIG. 2 illustrates the RFO signal, signals at nodes N32 and N50 (N34), the PCON signal and the RFI signal. When an RFO signal including abnormal peaks 180 is input to the bottom envelope detector 31, the bottom envelope detector outputs to node N32 a signal corresponding to the envelope of the RFO signal. The envelope hold circuit 33 responds to the signal of node 32 by outputting a signal to node N50 (N34). The comparator 35 compares the signal of node N32 with the signal of node N50 (N34) to output the PCON signal which changes its state from high to low according to the comparison result. When the logic state of the PCON signal is "low", which means that peaking is detected in the RFO signal, the peaking prevention portion 13 outputs a reference voltage, for example VCC/2. Otherwise, the peaking prevention portion 13 outputs the RFO signal.

Figure 3A:
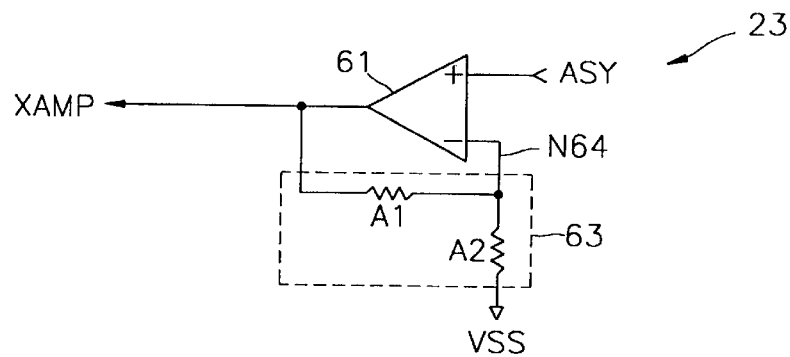
FIGS. 3A, 3B, and 3C are circuit diagrams of first, second, and third preferred embodiments of the amplifier of FIG. 1.

FIG. 3A is a circuit diagram of the amplifier 23 of FIG. 1A according to a first preferred embodiment of the present invention. Referring to FIG. 3A, the amplifier 23 includes a comparator 61 and a divider 63. In the comparator 61, the asymmetric signal ASY is connected to a non-inverting input terminal, and a signal XAMP is output. The divider 63, comprising resistors A1 and A2, divides the voltage of the output signal XAMP of the comparator 61. The divided voltage N64 is provided to an inverting input terminal of the comparator 61. The voltage of the output signal N64 of the divider 63 is determined according to the ratio of resistors A1 and A2.

Figure 3B:
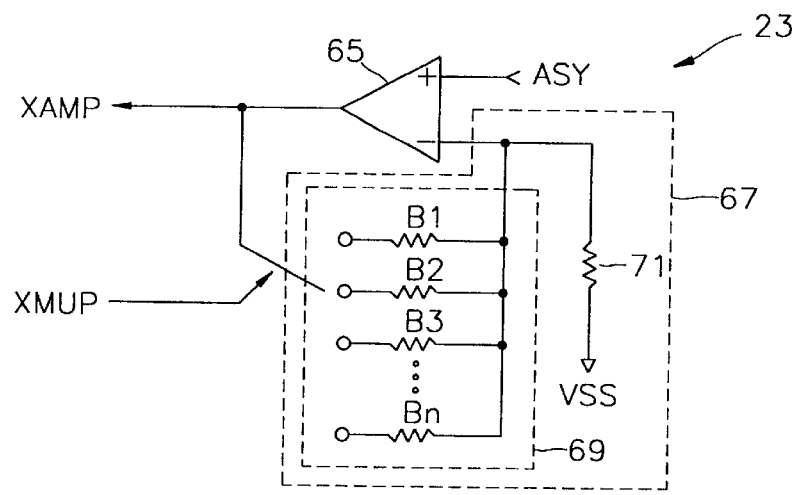

FIG. 3B is a circuit diagram of the amplifier 23 of FIG. 1A according to a second preferred embodiment of the present invention. Referring to FIG. 3B, the amplifier 23 includes a comparator 65 and a divider 67. In the comparator 65, the asymmetric signal ASY is connected to a non-inverting input terminal, and a signal XAMP is output. The divider 67 comprises a variable resistor portion 69 and a resistor 71. The variable resistor portion 69 has a plurality of resistors B1, B2, B3, . . . , and Bn (n≧2) arrayed in parallel between the output signal XAMP of the comparator 65 and an inverting input terminal of the comparator 65. The resistors B1, B2, B3, . . . , and Bn preferably have different resistance values from one another and one of the above resistors is selected in response to a signal XMUP which is determined by reproducing speed. The selected resistor is connected between the inverting input terminal and the output signal XAMP of the comparator 65. The resistor 71 is connected between the inverting input terminal of the comparator 65 and a ground voltage VSS. Thus, according to the signal XMUP which determines a multiple speed such as 2× or 3×, one of the resistors B1, B2, B3, . . . , and Bn is selected. The selected resistor is connected to the resistor 71 to determine voltage across the resistor 71, that is, the voltage applied to the inverting input terminal of the comparator 65.

Figure 3C:
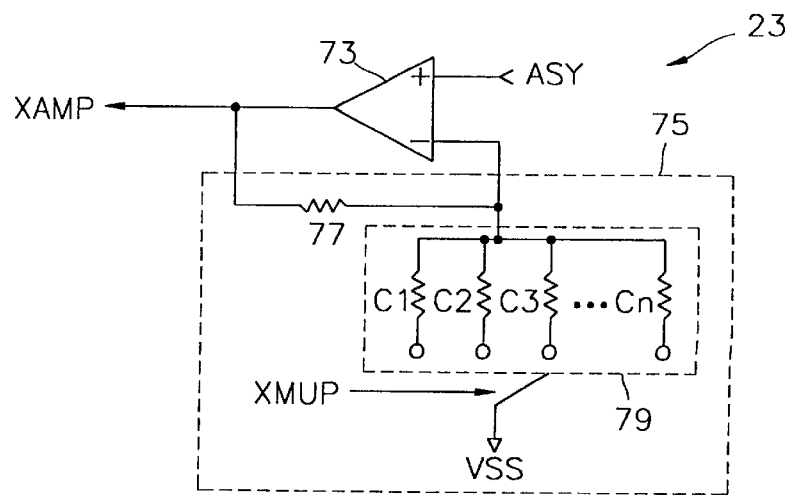

FIG. 3C is a circuit diagram of the amplifier 23 of FIG. 1A according to a third preferred embodiment of the present invention. The third embodiment includes a comparator 73, a variable resistor portion 79, and a resistor 77, and is similar in structure to the second embodiment of FIG. 3B. However, the variable resistance portion 79 is arrayed in parallel between the ground voltage VSS and an inverting input terminal of the comparator 73. The resistor 77 is arrayed between the inverting input terminal of the comparator 73 and an output signal XAMP of the comparator 73.

Figure 4:
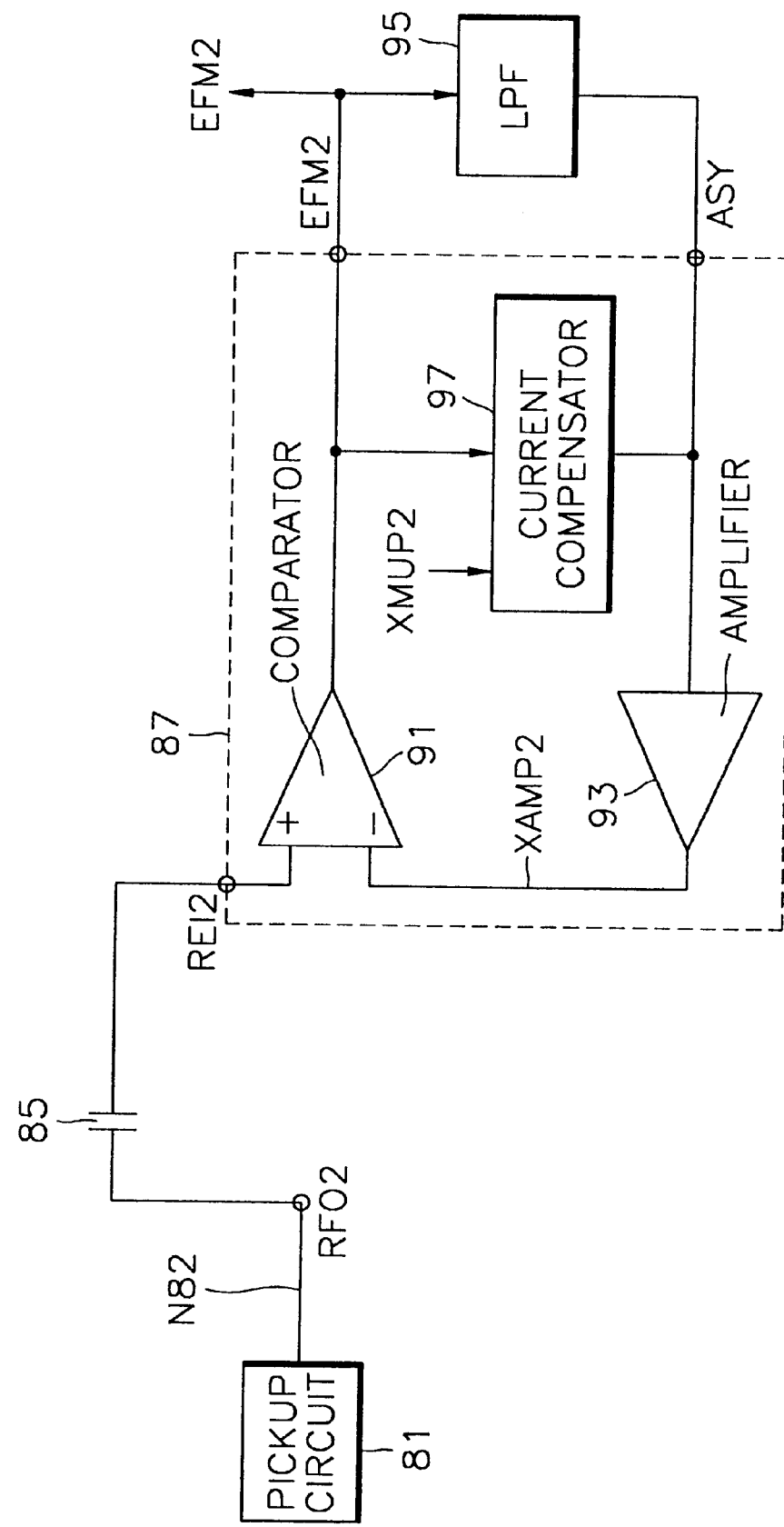
FIG. 4 is a circuit diagram of an EFM signal conversion apparatus according to a second preferred embodiment of the present invention.

FIG. 4 is an EFM signal conversion apparatus according to a second preferred embodiment of the present invention, including a high frequency extractor 85 and a slicer 87. The high frequency extractor 85 receives a signal RFO2 output from a pickup circuit 81, and outputs a signal RFI2 by extracting a high frequency component from signal RFO2. The slicer 87 slices the signal RFI2 by a predetermined level and outputs the sliced signal. The amount of current supplied or sunk is variable according to the multiple speed in the slicer 87. The slicer 87 consists of a comparator 91, an amplifier 93, and a current compensator 97. Since the comparator 91 and the amplifier 93 have similar functions to those of the comparator 21 and the amplifier 23 of the first preferred embodiment shown in FIG. 1A, descriptions thereof will be omitted. The current compensator 97 supplies a predetermined current to the amplifier 93 in response to an output signal EFM2 of the comparator 91 and a speed-multiplication-determination signal XMUP2.

Figure 5:
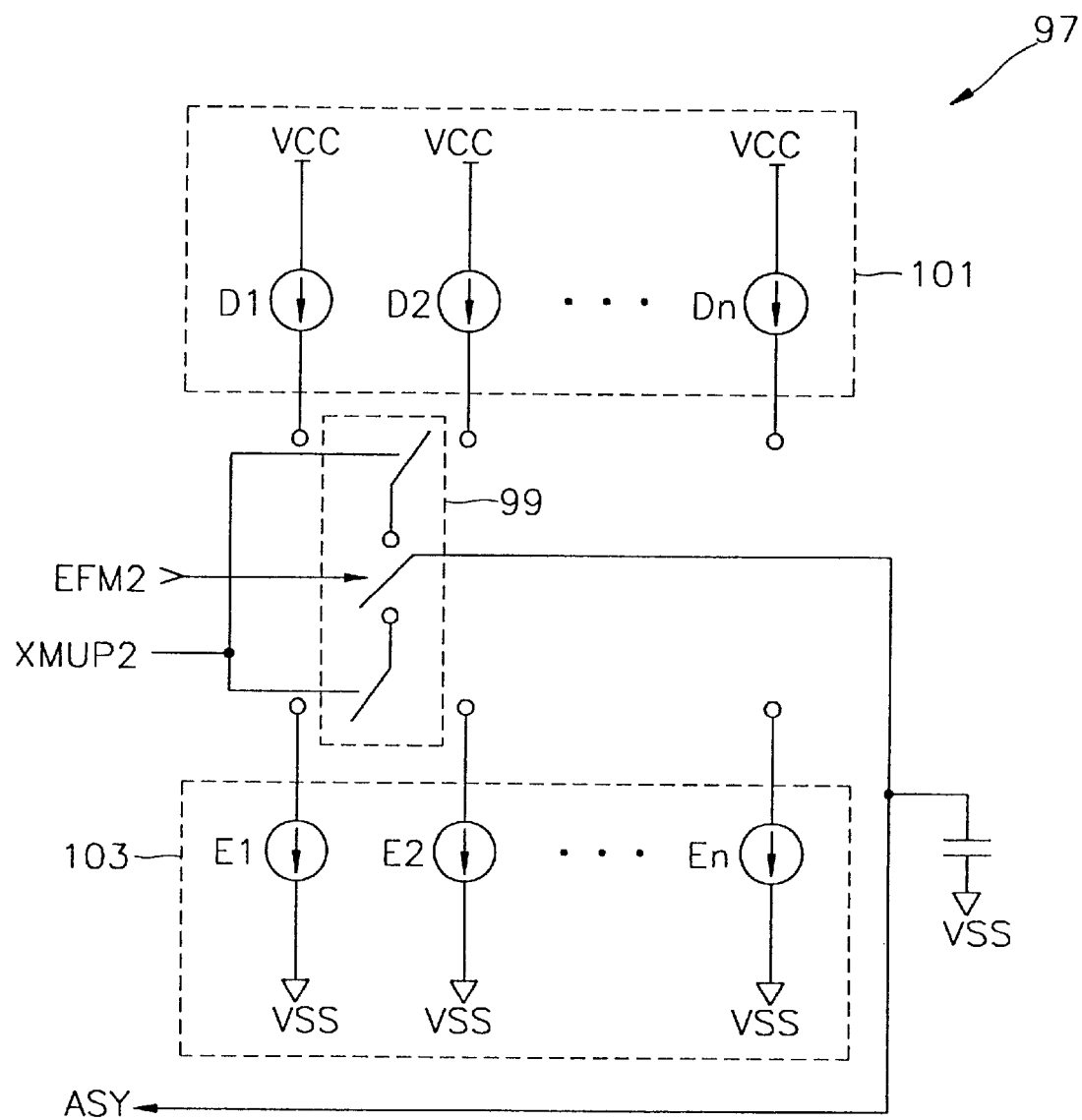
FIG. 5 is a circuit diagram of the current compensator of FIG. 4.

FIG. 5 is a circuit diagram of the current compensator 97 shown in FIG. 4. Referring to the drawing, the current compensator 97 includes a current source portion 101, a current sink portion 103, and a switch portion 99. The current source portion 101 consists of a plurality of current sources D1, D2, . . . , and Dn (n≧2), arrayed in parallel, for supplying currents of different levels. The current sink portion 102 consists of a plurality of current sinks E1, E2,. . . , and En (n≧2), arrayed in parallel, for sinking currents of different levels. The switch portion 99 selects one of the current sources (D1, D2, . . . , and Dn) or one of the current sinks (E1, E2, . . . , and En), in response to the output signal EFM2 of the comparator 91 and the speed-multiplication-determination signal XMUP2, to connect the selected terminal to the non-inverting signal terminal ASY, i.e., the input terminal of the amplifier 93. That is, the amount of current flow varies by selectively connecting the current source or the current sink according to the multiple speed. The response velocity may be equalized by varying the amount of current by the current compensator 97 according to the multiple speed.

Figure 6:
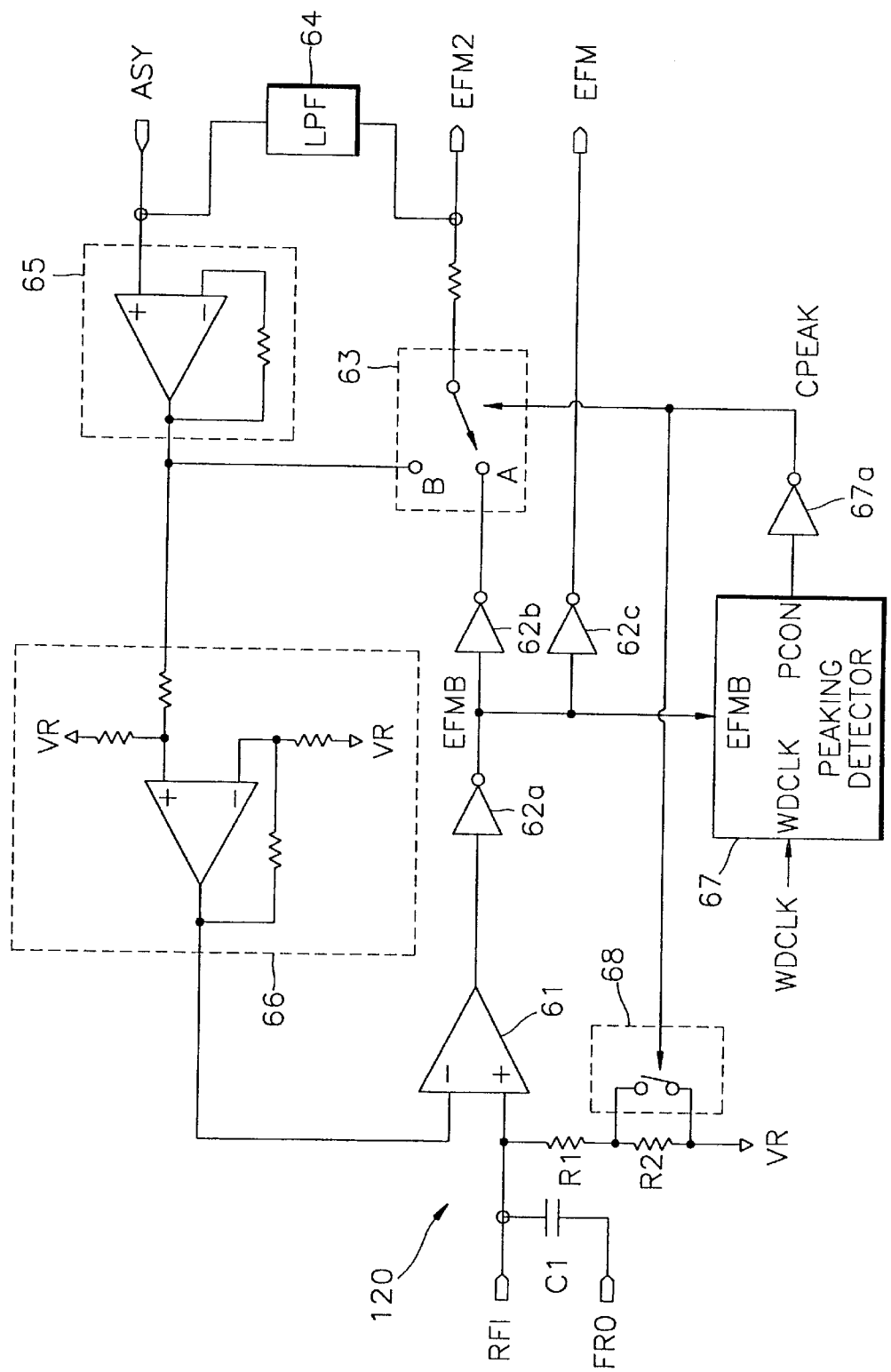
FIG. 6 is a circuit diagram of an EFM signal conversion apparatus according to a third preferred embodiment of the present invention.

FIG. 6 is a circuit diagram of an EFM signal conversion apparatus according to an alternative embodiment of the present invention. Reference numeral 61 denotes a slice comparator; reference numerals 62a, 62b, and 62c and 67a denote inverters; reference numeral 63 denotes a first switch; reference numeral 64 denotes a low pass filter; reference numeral 65 denotes a buffer; reference numeral 66 denotes an amplifier; reference numeral 67 denotes a peaking detector; and reference numeral 68 denotes a second switch. A capacitor C1 and resistors R1 and R2 constitute a high pass filter.

In the present embodiment, the RFI signal is determined to be sliced inappropriately due to the peaking phenomenon when the run-length of the signal is greater than a predetermined time period T, by using the property that a high or low period of the EFM output signal does not occur over the predetermined T at the most. That is, data loss or error due to the peaking phenomenon can be avoided by monitoring the run-length of the EFM signal.

The high pass filter 120 including an RC element (R1, R2, and C1) and the second switch 68 receives the RFO signal and passes only a high frequency portion of the signal. The RC parameter can be varied in order to make differentiation time variable according to a control signal CPEAK. The slice comparator 61 receives a filtered signal passing through the high pass filter and slices the signal by a predetermined level to generate the EFM signal. The peaking detector 67 detects a peaking period according to the run-length of the EFM signal output from the slice comparator 61 to generate the control signal CPEAK during the detected period. A slicing level generation portion including the first switch 63, the low pass filter 64, the buffer 65, and the amplifier 66 generates a slicing level which returns to the slice comparator 61 by selecting either the EFM signal output from the slice comparator 61 or the asymmetric signal in the previous period held at the buffer 65, depending on the control signal CPEAK.

The operation of the EFM signal conversion apparatus according to the present invention having the above structure will now be described as follows.

The high pass filter 120 receiving the RFI signal filters only a high frequency signal thereof to output the same. The RC parameter can be varied to make the differentiation time variable according to a predetermined control signal. Here, the differentiation time at the high pass filter including the RC element can be expressed as in the following equation:

$$\tau = RC \quad (1)$$

Accordingly, the differentiation time of the high pass filter shown in FIG. 6 varies according to the state of the second switch 68, which controls the connection state of the resistor R2. That is, when the second switch 68 is turned on, the differentiation time is expressed by equation 2, and when the second switch 68 is turned off, the differentiation time is expressed by equation 3:

$$\tau_1 = R_1 C \quad (2)$$

$$\tau_2 = (R_1 + R_2) C \quad (3)$$

Referring to Equations 2 and 3, the differentiation time when the second switch 68 is turned off is longer than that when the first switch is turned on.

The high pass filter according to the present embodiment further includes the second switch 68 in addition to the RC element. The second switch 68 is turned on/off by the control signal CPEAK generated by the peaking detector 67. The differentiation time can be adjusted according to a change in resistance value of a resistor forming the high pass filter. That is, the second switch 68 should be controlled to maintain a turned-on state when the RFI signal is normal and turned-off when peaking is generated at the RFI signal. The control signal CPEAK controls turning on/off of the second switch 68 as described above. When peaking is generated at the RFI signal, the differentiation time is prolonged so that a signal peaking phenomenon due to signal differentiation by the high pass filter can be prevented. In other words, the pulse width of the EFM output signal is measured and, if a "high" or "low" period of the output pulse continues over a predetermined time, a pole of the high pass filter disposed at the input terminal is moved to a low frequency region to prevent occurrence of peaking at the RFI signal and a stable EFM signal is detected.

The slicer comparator 61 receives the RFO signal passing through the high pass filter 64, i.e., the RFI signal, at a non-inverting input terminal thereof, and the asymmetric signal ASY passing through the buffer 65 and the amplifier 66 at an inverting input terminal, and compares the received two input signals to output the EFM signal.

Inverter 62a inverts the EFM signal to generate and output an EFMB signal to the peaking detector 67 and the inverter 62b. Inverter 62b inverts the EFMB signal, which is an output signal from the inverter 62a, and outputs the inverted signal to an input terminal A of the first switch 63. The inverter 62c inverts the EFMB signal to output the EFM signal.

The first switch 63 receives the EFM signal output from the inverter 62a at the input terminal A and the asymmetric signal ASY output from the buffer 65 at the input terminal B, and selects one of the EFM signal and the ASY signal according to the control signal CPEAK, to output the selected signal as the EFM2 signal. The low pass filter 64 detects a direct current level of the EFM2 signal output from the first switch 63 and generates the asymmetric signal ASY. The buffer 65 buffers the asymmetric signal ASY and the amplifier 66 amplifies the asymmetric signal ASY to a predetermined desired level and outputs the amplified signal to the inverting input terminal of the slicer comparator 61.

Thus, the slicing level signal input to the inverting input terminal of the slice comparator 61 is determined by either the asymmetric signal generated by the EFM signal output from the slice comparator 61 or the asymmetric signal in the previous period held at the buffer 65.

The peaking detector 67 receives the EFMB signal output from the inverter 62a and detects peaking, by detecting a period in which the run-length of the EFM signal is greater than a predetermined length according to a clock signal WDCLK, to generate a control signal PCON during the detected period, which will be described in detail below with reference to FIG. 7. The inverter 67a inverts the control signal PCON and generates the CPEAK signal, which controls the first and second switches 63 and 68.

Figure 7:
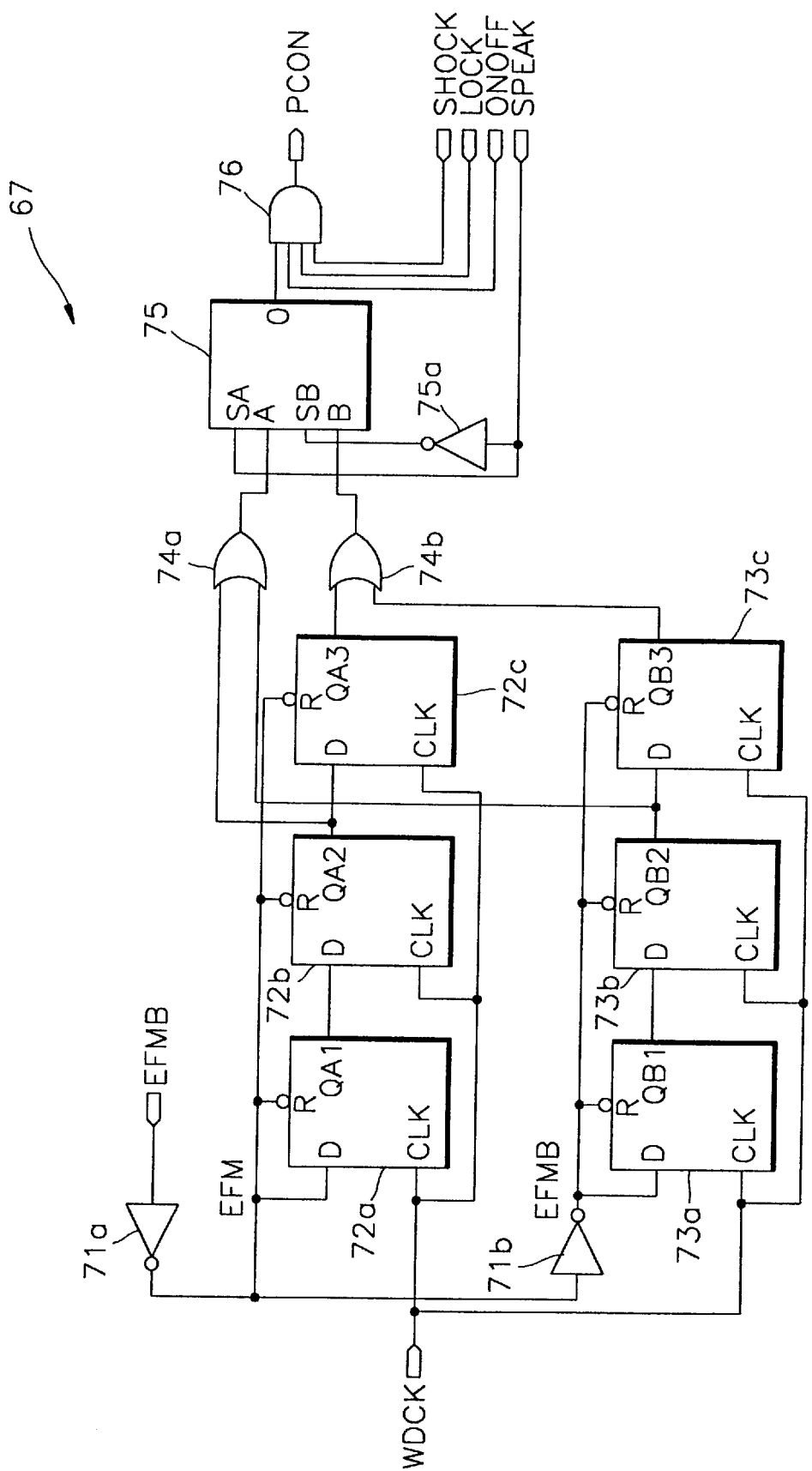
FIG. 7 is a circuit diagram of the peaking detector of FIG. 6.

FIG. 7 is a circuit diagram of the structure of the peaking detector 67 of FIG. 6. The peaking detector 67 includes a first plurality of flip-flops DFFA1–3 72a, 72b, and 72c which are triggered by the clock signal WDCK and receive the EFM signal at a data terminal D and a reset terminal R, a second plurality of flip-flops DFFB1–3 73a, 73b, and 73c which are triggered by the clock signal WDCK and receive the EFMB signal, i.e., an inverted EFM signal, at a data terminal D and a reset terminal R, logic OR gates 74a and 74b, an inverter 75a, a logic AND gate 76, and a data selector 75. The peaking detector 67 generates the control signal PCON by selecting one of signals output from the first and second flip-flops.

The operation of the peaking detector having the above structure is now described as follows.

The inverter 71a inverts the input signal EFMB and outputs the EFM signal to the reset terminal and the data terminal of the first flip-flops DFFA1–3 72a, 72b, and 72c. The inverter 71b inverts again the EFM signal and inputs the EFMB signal to the reset terminal and the data terminal of the second flip-flops DFFB1–3 73a, 73b, and 73c. The first flip-flops DFFA1–3 72a, 72b, and 72c and the second flip-flops DFFB1–3 73a, 73b, and 73c receive the EFM signal and the EFMB signal, respectively, and generate the respective output signals according to the clock signal WDCK. The logic OR gates 74a and 74b receiving the output signals of the flip-flops perform logic OR operation and output the same to the data selector 75.

The data selector 75 selects one of the outputs from the logic OR gates 74a and 74b according to a selection control signal SPEAK, to output the selected signal. The logic AND gate 76 which receives the output signals from the data selector 75 and control signals SHOCK, LOCK, and ONOFF performs a logic AND operation to generate the output signal PCON. Here, the SHOCK signal indicates whether an error has occurred due to vibration of a disk while playing. When the play state is normal, i.e., the SHOCK signal is "high", the PCON output is enabled. The LOCK signal indicates whether the current status is a disk play state. If a frame sink signal is not detected during 128 frames, the current status is determined not to be a play state and the LOCK signal becomes "low". Thus, when the LOCK signal is "high", i.e., in a play state, the PCON output is enabled. The ONOFF signal indicates whether operation of the peaking prevention portion is to be enabled. When all the SHOCK, LOCK, and ONOFF signals are "high", the logic AND gate 76 is enabled and change in the output signal of the data selector 75 is transferred to the PCON. The SPEAK signal and the inverting signal thereof are input to selection terminals SA and SB of the data selector 75, respectively.

Figure 8:
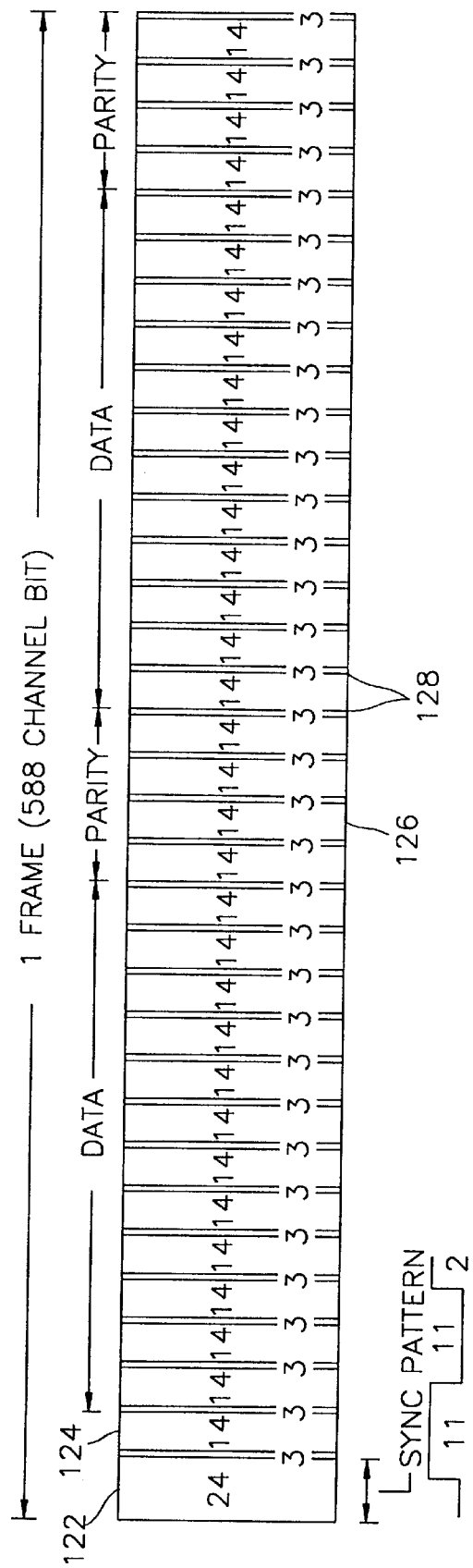
FIG. 8 is a view of the format of frame data recorded on a disk in order to explain the operation of the peaking detector shown in FIG. 7.

FIG. 8 illustrates the format of frame data recorded on a disk, for explaining the operation of the peaking detector of FIG. 7.

One data frame includes a frame sync signal 122 (24 bits), a symbol for a sub-coding 124 (14 bits), and 32 symbols for data and parity 126 (32×14 bits). 3-bit data 128 is inserted between neighboring symbols to combine the respective symbols. Thus, a single frame is formed of the total of 588 bits and, for example, when a frame frequency is 7.35 KHz, a clock frequency (1T) required for reading each bit data is 4.3218 MHZ (7.35 KHz×588).

In the EFM, an 8-bit symbol is converted into a 14-bit data pattern and two to ten logic "0's" should be disposed between logic "1" and logic "1". The sync pattern has an 11-bit-run-length. Therefore, a symbol having a 12-bit or greater run-length cannot be generated in the EFM. If such is generated, the data must be error data. The present invention takes into consideration and utilizes the above fact.

Figure 9:
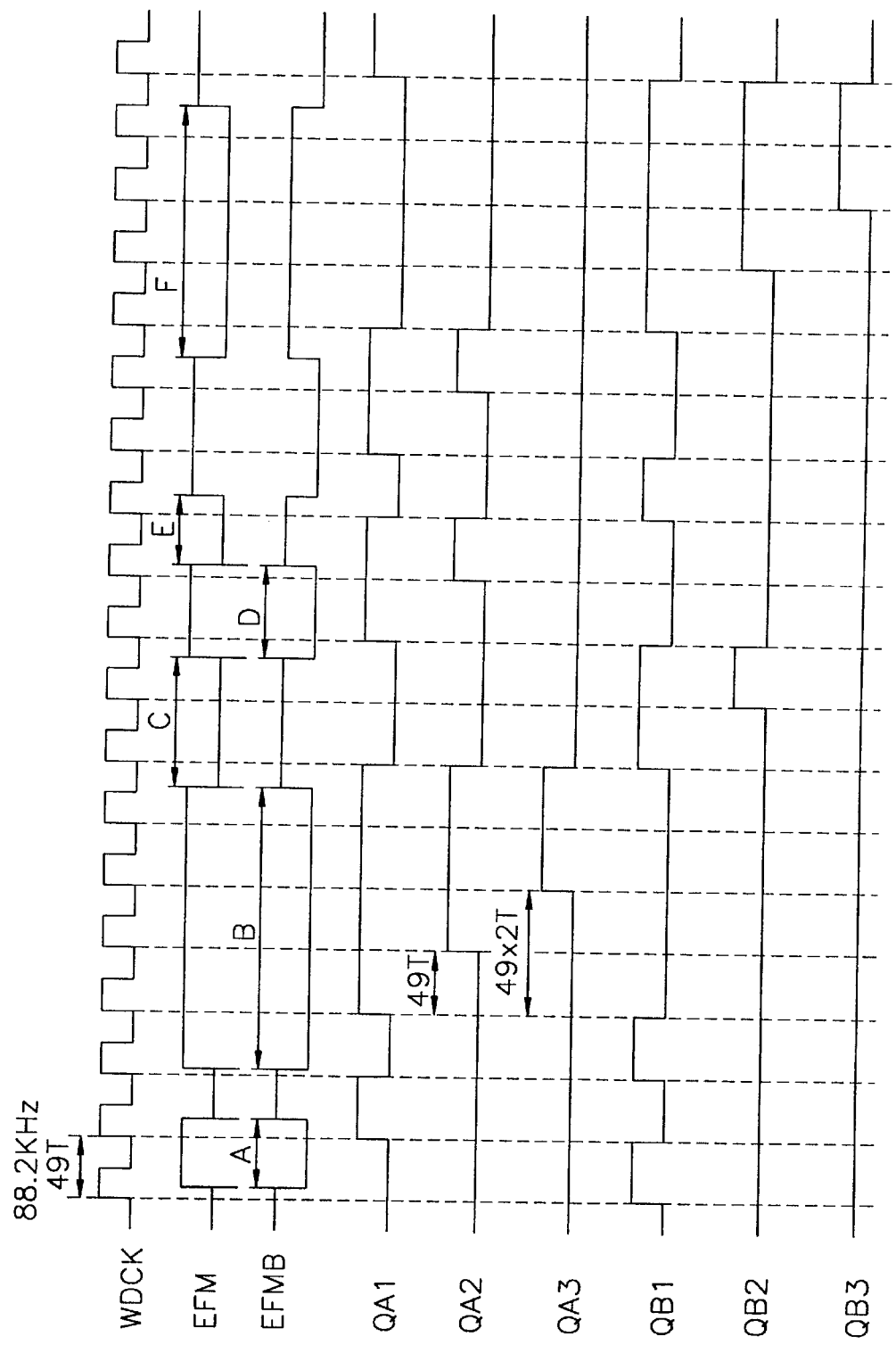
FIG. 9 is a waveform diagram illustrating the operation of the peaking detector shown in FIG. 7.

FIG. 9 is a waveform diagram for explaining the operation of the peaking detector shown in FIG. 7. If the clock signal WDCK is set as 88.2 KHz (49T) and the EFM signal and the EFMB signal are the same as those shown in the drawing, FIG. 9 shows waveforms of output signals QA1–3 of the first flip-flops DFFA1–3 (72a, 72b, and 72c) and output signals QB1–3 of the second flip-flops DFFB1–3 (73a, 73b, and 73c). Here, it is assumed that the flip-flops are triggered at the rising edge of the clock signal.

In a period A in which the EFM signal is "high", the output QA1 becomes "high" according to the rising edge of the clock WDCK. Since the EFM signal is "low" at the next clock, the output QA1 becomes "low". Thus, in this case, the output QA1 maintains a "high" state during one period of the clock signal, and since the flip-flops DFFA2–3 (72b and 72c) are not triggered, the output signals QA2–3 maintain a "low" state.

In a period B, the output QA1 becomes "high" and thereafter the output QA2 becomes "high" at the next clock signal. The output QA3 becomes "high" at the next clock signal. Thus, when the logic "high" period of the EFM signal is 49T or more, the output QA2 becomes "high". When the logic "high" period of the EFM signal is (49×2)T or more, the output QA3 becomes "high". The outputs QA1–3 of a "high" state continue until the EFM signal changes into a logic "low" state.

Next, in periods C, E, and F in which the EFM signal is "low", the outputs of the first flip-flops DFFA1–3 (72a, 72b and 72c) are reset and the second flip-flops DFFB1–3 (73a, 73b, and 73c) are triggered by the clock signal during the periods in which the inverted EFM signal, i.e., the EFMB signal, is "high".

In period F, the output QB1 becomes "high" according to the rising edge of the clock WDCK. After the output QB1 becomes "high", the output QB2 becomes "high" at the next clock signal. Also, the output QB3 becomes "high" at the next clock signal. Thus, when the logic "low" period of the EFM signal is 49T or more, the output QB2 becomes "high". When the logic "low" period of the EFM signal is (49×2)T or more, the output QB3 becomes "high". The outputs QB1–3 of a "high" state continue until the EFM signal changes into a logic "high" state.

Referring to FIGS. 7, 8, and 9 again, the process of detection of a peaking period will be described. The EFM signal is input to the first flip-flops DFFA1–3 (72a, 72b, and 72c) and the EFMB signal is input to the second flip-flops DFFB1–3 (73a, 73b, and 73c), and these flip-flops are triggered by the clock signal WDCK. If the logic "high" or "low" period of the EFM signal is 49T or more, QA2 or QB2 becomes "high" and these signals are input to the logic OR gate 74a. Also, If the logic "high" or "low" period of the EFM signal is (49×2)T or more, QA3 or QB3 becomes "high" and these signals are input to the logic OR gate 74b. The output signal of the OR gate 74a is transmitted to the input terminal A of the data selector 75. The output signal of the OR gate 74b is transmitted to the input terminal B of the data selector 75.

The data selector 75 selects one of the inputs A or B according to the selection control signal SPEAK and output the selected input. Thus, when the control signals are enabled and the output of the data selector 75 is "high", the output PCON becomes "high". This state signifies that the run-length of the EFM signal continues for a predetermined period and thus a peaking phenomenon occurs at that period.

The selection control signal SPEAK sets the run-length for detection of a peaking error. If the run-length is too short, an interrupt for peaking compensation is so frequently generated that performance of a system may be rendered unstable. Otherwise, a data error due to peaking may be generated. Thus, the run-length for peaking detection should be set appropriately considering the above two cases.

Figure 10A:
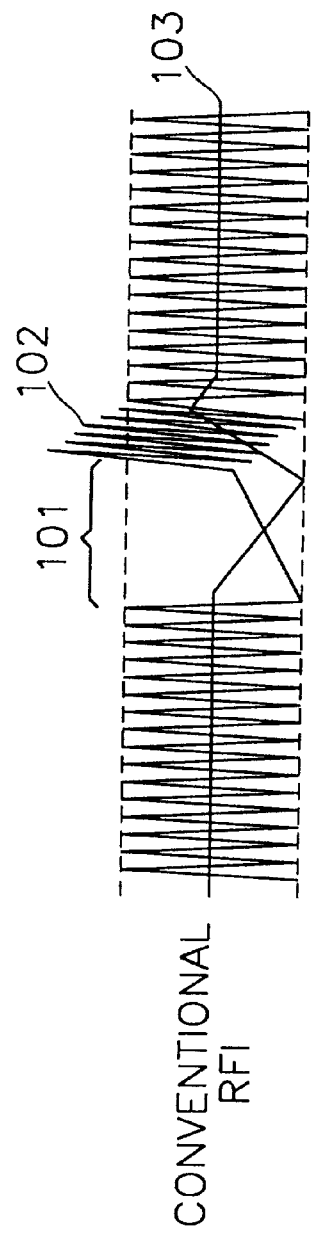
FIGS. 10A and 10B are signal waveform views illustrating the effect of the EFM signal conversion apparatus according to the present invention shown in FIG. 6.
Figure 10B:
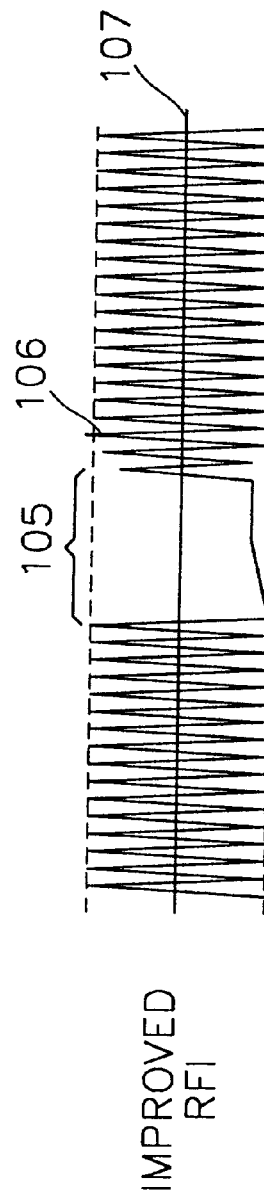
Figure 11:
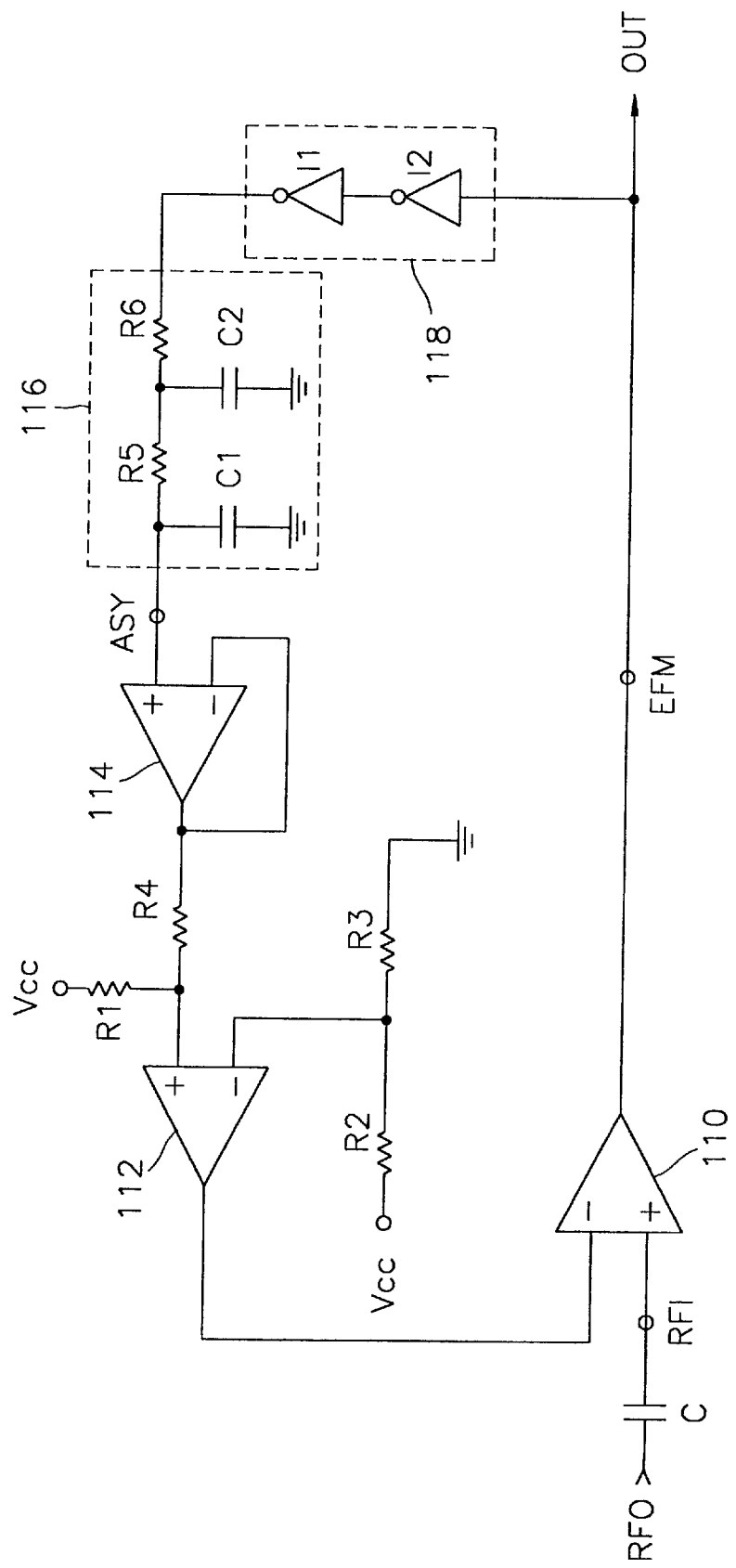
FIG. 11 is a circuit diagram of a conventional EFM signal conversion apparatus.

FIGS. 10A and 10B show the effects of the EFM signal conversion apparatus according to the present invention shown in FIG. 6. Here, FIG. 10A shows the conventional RFI signal and FIG. 10B shows an improved RFI signal according to the present invention.

According to the conventional technology, peaking 102 is generated excessively at the RFI signal, which is caused by a period 101 where the signal has either no eye pattern or a damaged eye pattern. Also, since a slicing level signal is generated from the RFI signal, a direct current level of the eye pattern rises instantly and accordingly a lot of time is taken to normally extract the direct current offset. Thus, as shown in the drawing, an inaccurate slicing level signal 103 is generated and the eye pattern is not normally sliced.

According to the present invention, when a peaking period 105 is generated, the peaking phenomenon hardly occurs at the RFI signal by increasing the differentiation time of the high pass filter disposed at the input terminal, as shown in FIG. 10B (see 106). When the peaking period 105 is detected, the signal of the period is determined to be an abnormal signal. Then, a slicing level signal is generated by the previous normal signal (see 107) and the slicing level signal is fed back to the slice comparator 61 (see FIG. 6), thereby detecting the EFM signal accurately.

In the present invention, the minimum run-length for detection of peaking can be set as 12T and the run-length set can be performed by appropriately selecting the frequency of the clock signal WDCK and the number of the flip-flops included in the peaking detector. The clock signal WDCK used for the above-described preferred embodiment can correspond to a multiple speed reproduction by doubling the frequency thereof for 2× reproduction. Also, in the structure of the high pass filter, a capacitance value may be controlled to vary by the switch, instead of controlling the resistance value.

As described above, according to the EFM signal conversion apparatus according to the present invention, occurrence of peaking at the input signal is detected and the detected peaking is compensated for so that a stable EFM signal can be reproduced.

While this invention has been particularly shown and described with references to preferred embodiments thereof, it will be understood by those skilled in the art that various changes in form and details may be made therein without departing from the spirit and scope of the invention as defined by the appended claims.

For example, while the present invention has been described with reference to the EFM signal conversion apparatus as employed in a compact disk (CD) player, the invention is equally applicable to alternative optical systems, for example a CD-ROM, video-CD, or DVD player. In other words, the invention is applicable to any optical system in which an RF signal is detected from an optical disk and converted to a conversion signal by slicing the detected RF signal by a predetermined level, and thus a stable output signal can be reproduced even though an error signal, such as peaking, is included in the RF signal.

What is claimed is:

1. An optical signal conversion apparatus for converting an RF input signal read from a disk into a conversion signal, said apparatus comprising:

a peaking prevention portion for detecting peaking of said RF input signal and for outputting a predetermined reference voltage if said peaking is detected, or for alternately outputting said input signal if said peaking is not detected; and a waveform processing portion for extracting a high frequency component from the signal output from said peaking prevention portion, for slicing the extracted signal component by a predetermined level, and for outputting the sliced signal.

2. The optical signal conversion apparatus as claimed in claim 1, wherein said peaking prevention portion comprises:

a peaking detector which detects peaking of said input signal and outputs a control signal according thereto; and a selector which receives a predetermined reference voltage and said input signal and selects and outputs said reference voltage if said peaking is detected, or said input signal if said peaking is not detected, in response to said control signal.

3. The optical signal conversion apparatus as claimed in claim 2, wherein said peaking detector comprises:

a bottom envelope detector which amplifies said input signal and outputs the same, if said input signal is higher than a predetermined threshold voltage, and otherwise, outputs said threshold voltage;

an envelope hold circuit which responds rapidly to a rise of an output signal from said bottom envelope detector and slowly to fall of the output signal from said bottom envelope detector; and a comparator which compares the output signal from said bottom envelope detector with an output signal from said envelope hold circuit.

4. The optical signal conversion apparatus as claimed in claim 3, wherein said envelope hold circuit comprises:

a comparator in which a signal in proportion to the output signal from said bottom envelope detector is applied to a non-inverting input terminal and an output signal thereof is applied to an inverting input terminal; and an electric condenser coupled to an output terminal of said comparator.

5. The optical signal conversion apparatus as claimed in claim 1, wherein said waveform processing portion comprises:

a high frequency extractor which extracts a high frequency component of said input signal and outputs the same as a conversion signal; and a slicer which slices said conversion signal by a predetermined level and outputs the sliced signal.

6. The optical signal conversion apparatus as claimed in claim 5, wherein said high frequency extractor comprises a capacitor connected between said peaking prevention portion and said slicer.

7. The optical signal conversion apparatus as claimed in claim 5, wherein said slicer comprises:

a comparator in which said conversion signal is connected to a non-inverting input terminal; and an amplifier in which an asymmetric signal generated by passing the output of the comparator through an external circuit, is connected to an input terminal thereof and an output signal thereof is connected to an inverting input terminal of said comparator.

8. The optical signal conversion apparatus as claimed in claim 7, wherein said amplifier comprises:

a comparator in which said asymmetric signal is connected to a non-inverting input terminal and an output signal thereof is connected to the output signal of said amplifier; and a divider which divides an output voltage of said comparator and outputs the same to an inverting input terminal of said comparator.

9. The optical signal conversion apparatus as claimed in claim 8, wherein said divider comprises:

a variable resistance portion having a plurality of resistors arrayed in parallel between the output terminal of said comparator and the inverting input terminal of said comparator; and a resistor connected between the inverting input terminal of said comparator and a ground, wherein said variable resistance portion selects one of said resistors in response to a multiple speed determination signal to connect the output terminal of said comparator to the inverting input terminal of said comparator.

10. The optical signal conversion apparatus as claimed in claim 8, wherein said divider comprises:

a resistor connected between the output terminal of said comparator and the inverting input terminal of said comparator; and a variable resistance portion having a plurality of resistors arrayed between the inverting input terminal of said comparator and the ground, wherein said variable resistance portion selects one of said resistors in response to a multiple speed determination signal to connect the output terminal of said comparator to the inverting input terminal of said comparator.

11. An optical signal conversion apparatus for converting an RF input signal read from a disk into an EFM signal, said apparatus comprising:

a high frequency extraction portion for extracting a high frequency component of said RF input signal and for outputting the same as a conversion signal; and a slice portion for slicing said conversion signal by a predetermined level and for outputting the sliced signal, wherein an amount of current supplied or sank in said slice portion is variable according to a multiple speed signal.

12. The optical signal conversion apparatus as claimed in claim 11, wherein said slice portion comprises:

a comparator in which said conversion signal is connected to a non-inverting input terminal;

an amplifier in which an asymmetric signal which is generated by low-pass-filtering the output signal of said comparator is connected to an input terminal thereof and an output signal thereof is connected to an inverting input terminal of said comparator; and a current compensator which variably supplies or sinks current to said amplifier in response to the output signal from said comparator and a predetermined multiple speed determination signal.

13. The optical signal conversion apparatus as claimed in claim 12, wherein said current compensator comprises:

a current source portion in which a plurality of current sources each providing current of a different amount are arrayed in parallel;

a current sink portion in which a plurality of current sinks each sinking current of a different amount are arrayed in parallel; and a switch portion in which said asymmetric signal is connected to one of said current sources or said current sinks in response to the output signal of said comparator and also said predetermined multiple speed determination signal.

14. A peaking detection circuit for detecting peaking of an RF input signal read from a disk, said circuit comprising:

a bottom envelope detector for amplifying said input signal and outputting the same if said input signal is greater in voltage than a predetermined reference voltage, and alternately, if the input signal is lower in voltage than the predetermined reference voltage, outputting said reference voltage;

an envelope hold circuit which responds rapidly to rise of the output signal from said bottom envelope detector and slowly to fall of the output signal from said bottom envelope detector; and a comparison portion which compares the output signal of said bottom envelope detector with an output signal from said envelope hold circuit.

15. The peaking detection circuit as claimed in claim 14, wherein said envelope hold circuit comprises:

a comparator in which a signal in proportion to the output signal from said bottom envelope detector is applied to a non-inverting input terminal thereof and an output signal thereof is applied to an inverting input terminal thereof; and an electric condenser connected to an output terminal of said comparator, wherein said comparator rapidly responds to a rising voltage of the output signal input to the non-inverting terminal thereof and slowly responses to a falling voltage thereof.

16. The peaking detection circuit as claimed in claim 14, wherein said bottom envelope detector comprises:

a current source for supplying a predetermined amount of current;

a PNP transistor having a base receiving an inverted signal of said input signal and an emitter to which the current supplied from said current source is supplied;

a current sink which sinks a predetermined amount of current;

a NPN transistor having a base connected to the emitter of said PNP transistor and an emitter connected to said current sink; and an electric condenser for storing current of the base of said NPN transistor.

17. An optical signal conversion apparatus for converting an RF input signal read from a disk into a conversion signal, said apparatus comprising:

a high pass filter for filtering a high frequency signal from said input signal and for outputting the filtered signal and for varying differentiation time according to a control signal;

a comparator for receiving the output filtered signal and for generating a conversion signal by slicing the received signal by a predetermined level by comparing the output filtered signal to a slicing level;

a peaking detector for detecting a peaking period according to run-length of the conversion signal output from said comparator and for generating the control signal which is applied to said high pass filter during the detected period; and a slicing level generator for generating a slicing level according to a direct current level of said conversion signal.

18. The optical signal conversion apparatus as claimed in claim 17, wherein said high pass filter includes a capacitor and first and second resistors, and a first switch which selectively shorts said second resistor according to said control signal from said peaking detector.

19. The optical signal conversion apparatus as claimed in claim 17, wherein said peaking detector detects a period in which run-length of the conversion signal output from said comparator is greater than a predetermined length and generates the control signal during the detected period.

20. The optical signal conversion apparatus as claimed in claim 17, wherein said peaking detector comprises:

a first plurality of flip-flops triggered by a clock signal and in which said conversion signal is input to data terminals and reset terminals thereof;

a second plurality of flip-flops triggered by said clock signal and in which an inverted signal of said conversion signal is input to data terminals and reset terminals thereof; and a selector which selects one signal of the outputs from said first and second flip-flops and thus generates said control signal.

21. The optical signal conversion apparatus as claimed in claim 20, wherein said selector further comprises an enable circuit which enables said control signal according to at least one signal among a signal indicating whether an error due to vibrations of said disk while playing is generated, a signal determining whether the current state is a disk play mode, and a signal determining enablement of peaking prevention.

22. An optical signal conversion apparatus for converting an RF input signal read from a disk into a conversion signal, said apparatus comprising:

a high pass filter for filtering a high frequency signal from said input signal and for outputting the filtered signal;

a comparator which compares the output filtered signal and a slicing level and generates a conversion signal by slicing the received signal by the slicing level;

a peaking detector which detects a peaking period according to run-length of the conversion signal output from said comparator and generates a control signal during the detected period; and a slicing level generator which selects, according to said control signal, one of said conversion signal and an asymmetric signal held from a previous period and generates a slicing level provided to said comparator.

23. The optical signal conversion apparatus as claimed in claim 22, wherein said slicing level generator comprises:

a second switch selective of said conversion signal or said asymmetric signal according to the control signal;

a low pass filter for detecting a signal of direct current level from an output signal of said second switch and for generating an asymmetric signal;

a buffer for buffering the asymmetric signal and for outputting the same to an input terminal of said second switch; and an amplifier for amplifying the buffered asymmetric signal to a predetermined level and for providing the amplified signal to said comparator.

24. The optical signal conversion apparatus as claimed in claim 22, wherein said peaking detector detects a period in which run-length of the conversion signal output from said comparator is greater than a predetermined length and generates the control signal during the detected period.

25. The optical signal conversion apparatus as claimed in claim 22, wherein said peaking detector comprises:

a first plurality of flip-flops triggered by a clock signal and in which said conversion signal is input to data terminals and reset terminals thereof;

a second plurality of flip-flops triggered by said clock signal and in which an inverted signal of said conversion signal is input to data terminals and reset terminals thereof; and a selector which selects one signal of the outputs from said first and second flip-flops and generates said control signal.

26. The optical signal conversion apparatus as claimed in claim 25, wherein said selector further comprises an enable circuit which enables said control signal according to at least one signal among a signal indicating whether an error due to vibrations of said disk while playing is generated, a signal determining whether the current state is a disk play mode, and a signal determining enablement of peaking prevention.

27. An optical signal conversion apparatus for converting an RF input signal read from a disk into a conversion signal, said apparatus comprising:

a high pass filter for filtering a high frequency signal from said input signal and for outputting the filtered signal, said high pass filter adapted for varying differentiation time according to a control signal;

a comparator which compares the output filtered signal and a slicing level and generates a conversion signal by slicing the received signal by the slicing level;

a peaking detector which detects a peaking period according to run-length of the conversion signal output from said comparator and generates a control signal during the detected period; and a slicing level generator which selects, according to a control signal, one of said conversion signal and an asymmetric signal held from a previous period and generates a slicing level provided to said comparator, wherein said control signal of said peaking detector is provided to said high pass filter and said slicing level generator.

28. A peaking detection apparatus for detecting peaking at an RF input signal read from a disk, said apparatus comprising:

a comparator for receiving said RF signal and for generating a conversion signal by slicing the received signal by a predetermined level;

a first plurality of flip-flops triggered by a clock signal and in which the conversion signal is input to data terminals and reset terminals thereof;

a second plurality of flip-flops triggered by said clock signal and in which an inverted signal of the conversion signal is input to data terminals and reset terminals thereof; and a selector which selects one signal of the outputs from said first and second flip-flops and generates said control signal, wherein said peaking detector detects a period in which run-length of the conversion signal output from said comparator is greater than a predetermined length and generates the control signal during the detected period.

* * * * *